United States Patent [19]

Nordstrom

[11] Patent Number: 4,530,483
[45] Date of Patent: Jul. 23, 1985

[54] SIDE GUIDE FOR CARGO LOADING SYSTEM

[75] Inventor: Arnold B. Nordstrom, Torrance, Calif.

[73] Assignee: Ancra Corporation, El Segundo, Calif.

[21] Appl. No.: 426,761

[22] Filed: Sep. 30, 1982

[51] Int. Cl.³ ............................................. A47B 97/00
[52] U.S. Cl. ..................................... 248/500; 410/81
[58] Field of Search ...................... 248/500, 503.1, 499, 248/503; 410/69, 79, 80, 104, 105, 115, 102, 81

[56] References Cited

U.S. PATENT DOCUMENTS

| | | | |
|---|---|---|---|
| 2,893,677 | 7/1959 | Dannenburg | 248/228 |
| 3,111,912 | 11/1963 | Keiter | 248/228 UX |
| 3,241,501 | 3/1966 | Watts | 410/105 |
| 3,262,588 | 7/1966 | Davidson | 410/79 X |
| 3,465,995 | 9/1969 | Whitman | 248/228 |
| 3,480,239 | 11/1969 | Jensen et al. | 410/92 X |
| 4,077,590 | 3/1978 | Shorey | 410/92 X |
| 4,089,275 | 5/1978 | Pelletier | 410/79 |

Primary Examiner—J. Franklin Foss
Attorney, Agent, or Firm—Edward A. Sokolski

[57] ABSTRACT

A side guide for a cargo loading system for use in loading cargo-loaded pallets into a vehicle, such as an aircraft. The side guide assembly is removably mounted in a track or channel assembly having alternate cutout portions and lip portions. The side guide assembly includes a frame on which rollers are mounted and a side guide portion suitable for receiving the edge of a pallet, a plurality of such assemblies being employed for restraining such pallet against other than slidable motion on the rollers. The frame assembly has tension lug means extending outwardly and normally from the bottom edge thereof, and shear lug means extending therefrom normally and in an opposite direction to the tension lug means. The frame further has an opening formed on the end of an arm extending therefrom. The assembly is removably installed in the vehicle by sliding the tension lug means into the track underneath the lip portions thereof while tilting the entire assembly upwardly and then lowering the assembly so that the shear lug means fits into the cutout portions of the track against the walls of said portions; with the opening in the end of the arm fitted over a stud member installed in a keyhole adapter in the vehicle floor, this opening portion fitting over the stud member and being retained thereto by means of a fastener member such as a nut.

7 Claims, 4 Drawing Figures

SIDE GUIDE FOR CARGO LOADING SYSTEM

This invention relates to cargo loading systems for loading palletized cargo into a vehicle such as an aircraft, and more particularly to a side guide roller assembly for use in such a system.

Systems have been developed in the prior art for facilitating the loading of palletized cargo into vehicles, such as aircraft; typical such systems being described in U.S. Pat. No. 3,480,239 to Jensen et al., issued Nov. 25, 1969. A side guide assembly is shown and described in connection with FIGS. 5 and 6 of this patent for guiding the longitudinal movement of the pallet and limiting outward transverse movement thereof. This side guide assembly employs a spring-actuated plunger member which fits into the track which operates in conjunction with a supporting leg and roller members to provide the desired transverse restraint and longitudinal freedom of movement of the pallets.

The side guide assembly of the present invention provides distinct advantages over that of the prior art in that it eliminates the need for moving parts such as spring actuated plungers and the like and is of a simple, one-piece construction of lower weight and less cost than such assemblies of the prior art.

The improvement of the present invention is achieved by employing tensioning lug means which operates in conjunction with shear lug means to retain one end of the assembly in the track while the other end of the assembly has an opening formed therein which is retained to the floor of the vehicle over a stud member mounted on such floor. The assembly of the present invention can readily be moved into a mounting position by a rocking motion, i.e., placing the tensioning lug means under the lips of the track member with the assembly in an upwardly tilted position and then lowering the assembly to bring the shear lug means into the cutout portions of the track in abutment against the sides thereof, with the opening portion of the assembly fitted onto the stud mounted in the vehicle floor and retained thereto.

It is therefore an object of this invention to provide an improved side guide assembly for a cargo loading system which is of more economical construction than such prior art devices.

It is a further object of this invention to provide an improved side guide assembly for a cargo loading system which is of lighter weight than such prior art devices.

It is a further object of this invention to provide a side guide assembly for a cargo loading system which can more easily be installed and removed from its installed portion than prior art systems.

Other objects of the invention will become apparent from the following description taken in connection with the accompanying drawings of which:

Figure 1:
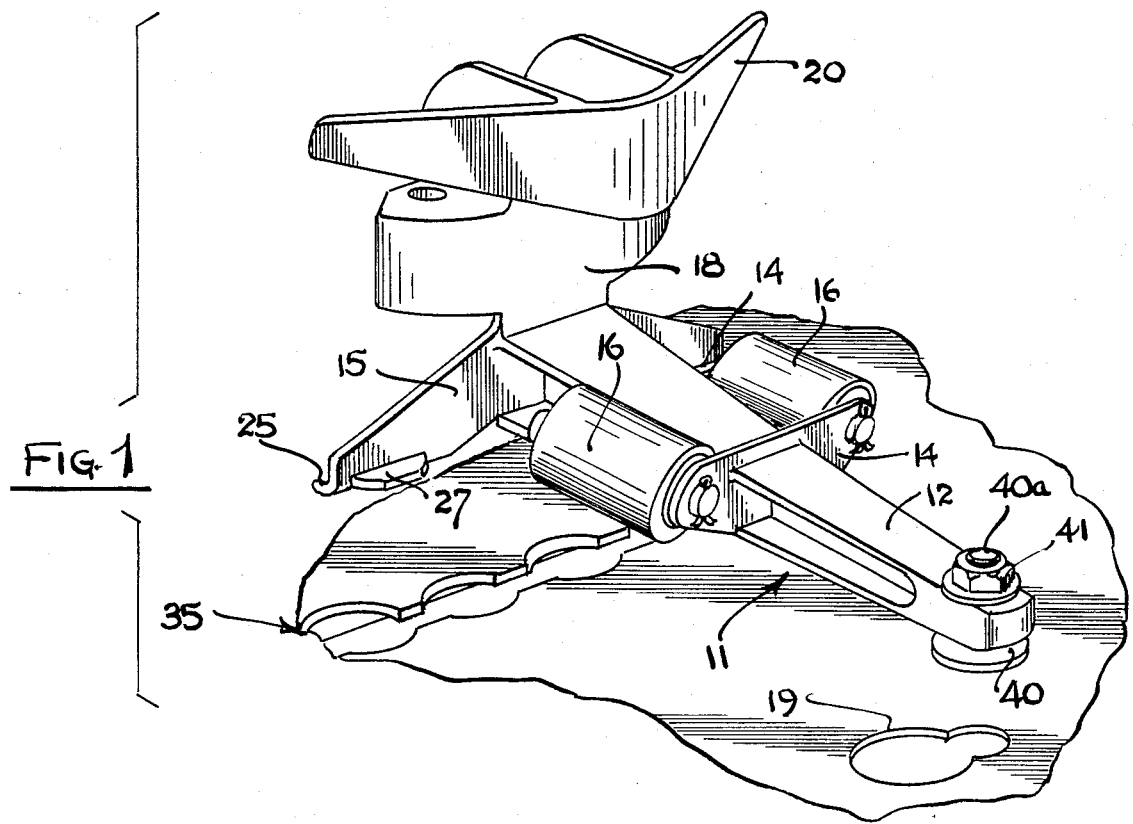
FIG. 1 is a perspective view showing a preferred embodiment of the invention installed in a track.
Figure 4:
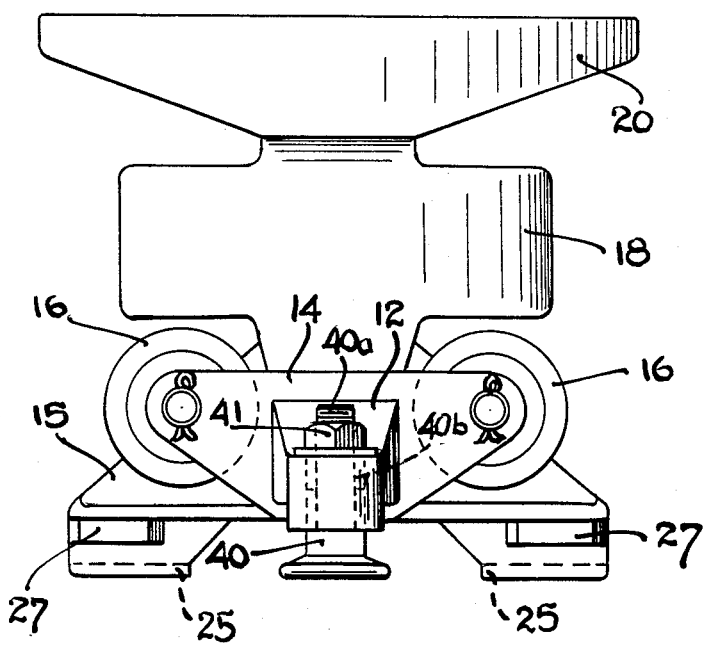
FIG. 4 is an end elevational view of the preferred embodiment.

Referring now to the figures, the device of the invention includes a main frame 11. The frame has an elongated arm 12 which has an opening 12a at one extreme end thereof and a pair of cross arms 14 between which a pair of roller members 16 are rotatably supported. A guide plate 18 extends upwardly from arm 12 near one end thereof and an overhanging member 20 extends inwardly at substantially right angles to guide plate 18, guide plate 18 and overhanging member 20 functioning to guide a pallet for longitudinal movement on rollers 16. Along the bottom edge of cross arm 15 of frame 11 and extending normally to the longitudinal axis thereof are tension lugs 25. Extending from cross arm 15, directly above tension lug 25 and running in substantially the opposite direction thereas, are a pair of shear lugs 27.

Figure 2:
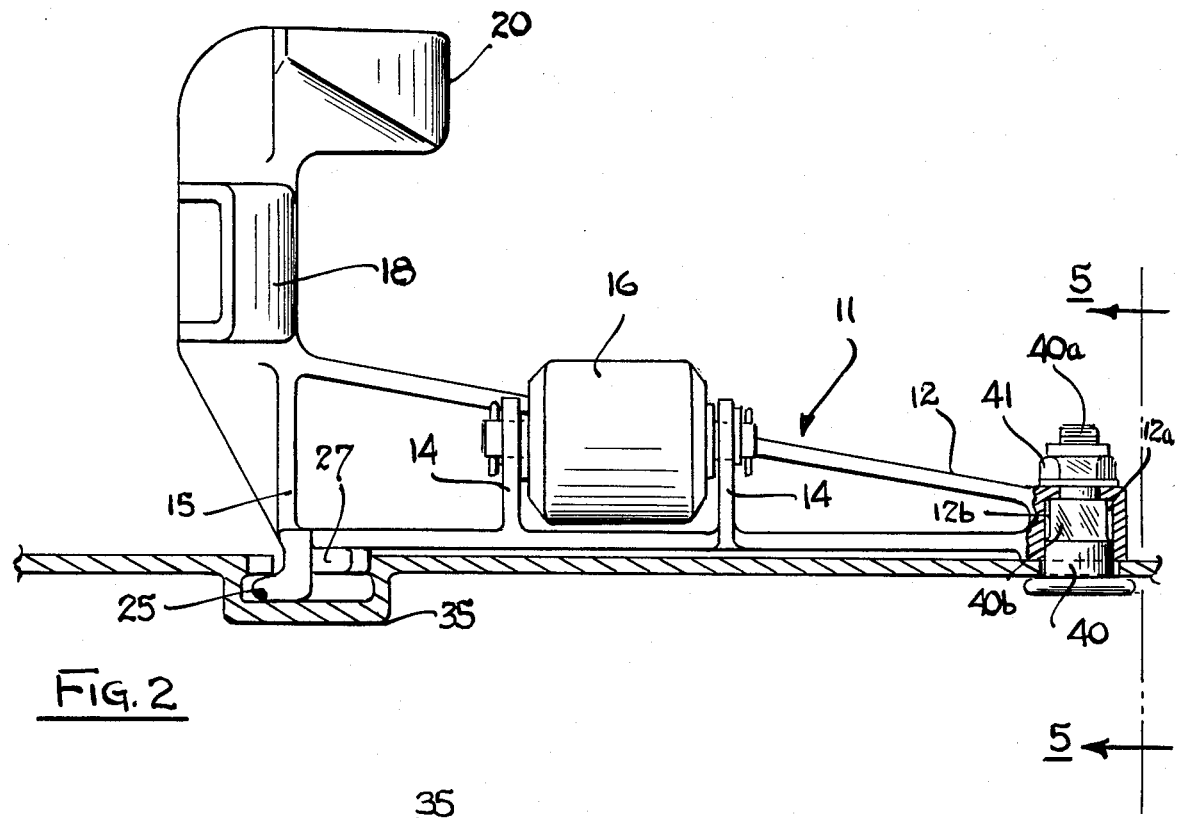
FIG. 2 is a side elevational view of the preferred embodiment.
Figure 3:
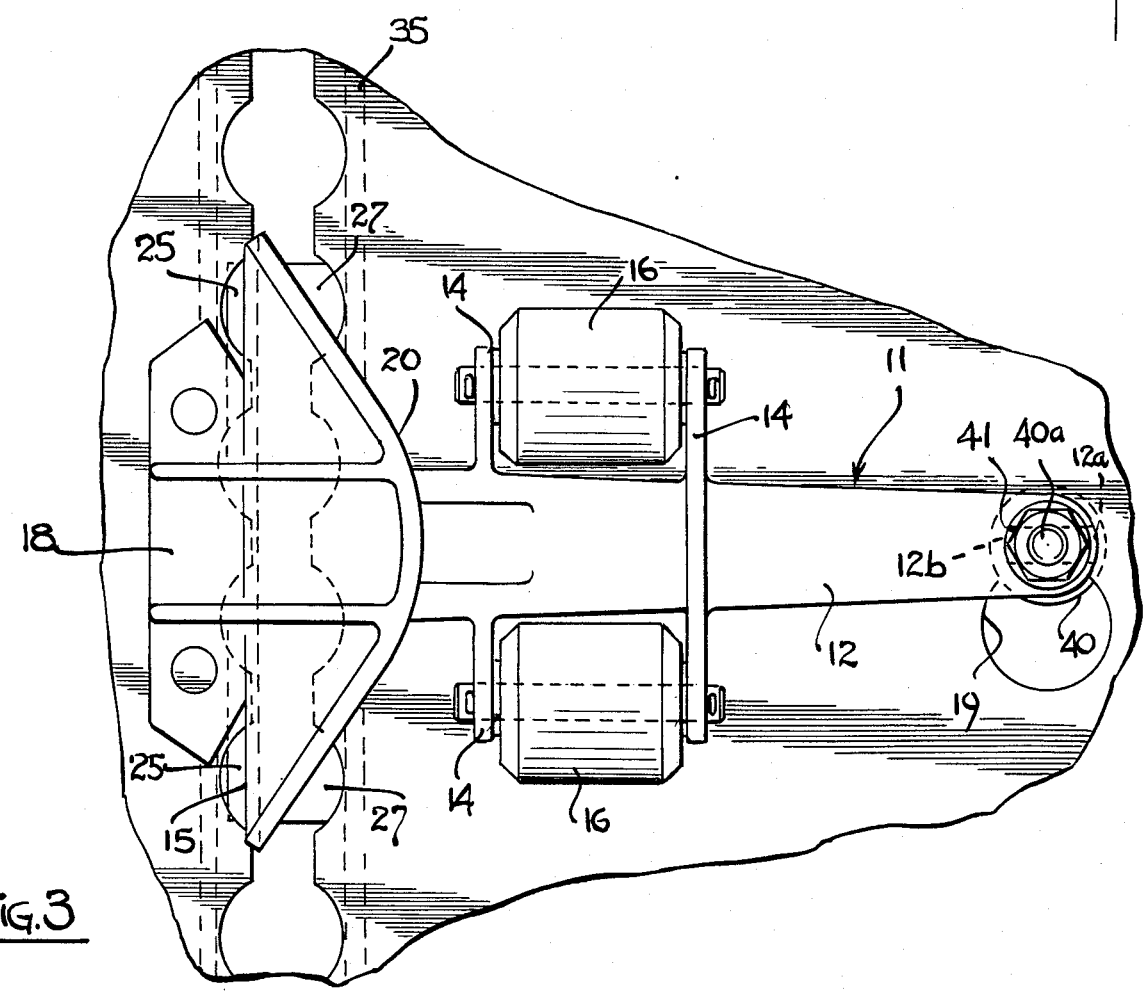
FIG. 3 is a top plan view of the preferred embodiment.

The side guide assembly is installed in the track 35 as shown in FIG. 2 by inserting tension lugs 25 into track 35 under the lip portions 35a of the scalloped track, with the device angled relative to the track as shown in FIGS. 2 and 3. The side guide assembly is then rocked down into position with shear lugs 27 inserted in the cutout portions 35b of the track and in abutment thereagainst. In the installed position, opening portion 12a of arm 12 fits over stud 40 which is fixedly mounted in the floor of the vehicle in a keyhole adapter 19 installed in such floor. Stud 40 has a threaded top portion 40a on which a nut 41 is threadably tightened to retain the side guide in position in the track. The stud further has flattened sides 40b which abut against similarly flattened side portions of opening 12a. Thus, as can be seen, the assembly can be rapidly and easily installed in position and just as easily removed.

While the invention has been described and illustrated in detail, it is to be clearly understood that this is intended by way of illustration and example only and is not to be taken by way of limitation, the spirit and scope of the invention being limited only by the terms of the following claims.

I claim:

1. A side guide assembly for guiding a pallet for loading in a vehicle, said side guide assembly being mounted in a track member having alternate cutout and lip portions comprising:
    a frame having an elongated arm portion, one end of said arm portion having an opening formed therein,
    roller means,
    means for rotatably supporting said roller means on said arm portion,
    a guide plate extending from said arm portion towards the roller means in a direction substantially normal to the longitudinal axis of the arm portion,
    an overhanging member extending substantially normally from said guide plate towards the end of said arm portion having the opening formed therein,
    said guide plate and overhanging member operating to guide the pallet for movement on said roller means along an axis substantially normal to the longitudinal axis of said arm portion,
    cross arm means running transversely to the longitudinal axis of said arm portion,
    tension lug means extending from the cross arm means in a direction, substantially opposite to that of the overhanging member, said tension lug means being located along a lower edge of said cross arm means,
    shear lug means spaced on said frame from said tension lug means towards said guide plate and extending from the frame in a direction substantially opposite to that of said tension lug means, retainer stud means mounted on the vehicle floor and extending upwardly therefrom for engaging the opening portion in the end of the arm portion of said frame, said tension lug means being fitted in said track under the lip portions thereof with said shear lug means being fitted in the cutout portions of the track in shear abutment thereagainst and the opening portion of the elongated arm portion being fitted over the retainer stud means, and means for retaining the opening portion of the arm portion of the arm portion of the frame to said floor mounted retainer stud means.

2. The side guide assembly of claim 1 wherein the means for retaining the opening portion of the arm portion to the stud means comprises a threaded portion of the stud means and a nut which engages said threaded portion and abuts against the opening portion.

3. The side guide assembly of claim 1 wherein said shear lug means comprises a plurality of shear lugs spaced from each other substantially equally along the frame along a common axis substantially parallel to the longitudinal axis of said tension lug means.

4. The side guide assembly of claim 1 and further comprising keyhole adapter means for supporting the retainer stud means on the vehicle floor.

5. The side guide assembly of claim 1 wherein the means for rotatably supporting the roller means on said arm portion comprises a pair of cross arms extending substantially normally from said arm portion, said roller means comprising a pair of rollers rotatably supported between said cross arms.

6. The side guide assembly of claim 1 wherein the tension lug means comprises a plurality of lugs.

7. The side guide assembly of claim 1 wherein the retainer stud means has a flattened side portion, the sides of the opening in the arm portion being flattened to matingly engage the flattened side portion of the retainer stud means.

* * * * *